US005188256A

United States Patent [19]

Nottingham et al.

[11] Patent Number: 5,188,256

[45] Date of Patent: Feb. 23, 1993

[54] METHOD OF HEATING AND DISPENSING HOT MELT MATERIALS THAT EMPLOYS MICROWAVE ENERGY

[75] Inventors: John R. Nottingham; John Spirk, both of Moreland Hills; Craig M. Saunders, Rocky River; Paul E. Brokaw, Euclid, all of Ohio

[73] Assignee: Nottingham-Spirk Design Associates, Inc., Cleveland, Ohio

[21] Appl. No.: 562,518

[22] Filed: Aug. 6, 1990

[51] Int. Cl.⁵ .......................... B67B 7/00; B67D 5/62; B23K 15/10

[52] U.S. Cl. .................................. 222/1; 222/103; 222/146.5; 219/10.55 M; 219/10.55 R

[58] Field of Search .................... 222/1, 146.5, 103; 219/10.55 A, 10.55 E, 10.55 F, 10.55 M, 10.55 R; 426/107, 243, 241, 242; 99/DIG. 14

[56] References Cited

U.S. PATENT DOCUMENTS

| | | | |
|---|---|---|---|
| 1,242,165 | 10/1917 | Fitzgerald | 222/103 |
| 2,857,079 | 10/1958 | Hall | 222/103 |
| 3,262,605 | 7/1966 | Madden et al. | 222/103 |
| 3,831,815 | 8/1974 | Glasgow | 222/146.5 X |
| 3,858,985 | 1/1975 | Fiveash | 222/146.5 X |
| 4,230,924 | 10/1980 | Brastad et al. . | |
| 4,253,898 | 3/1981 | Rinker et al. . | |
| 4,267,420 | 5/1981 | Brastad . | |
| 4,421,973 | 12/1983 | Lou | 222/146.5 X |
| 4,626,642 | 12/1986 | Wang et al. . | |
| 4,801,777 | 1/1989 | Auerbach | 219/10.55 |
| 4,841,112 | 6/1989 | Peleg | 426/107 X |
| 4,864,090 | 9/1989 | Maxwell et al. . | |
| 4,876,427 | 10/1989 | Mode | 426/107 X |
| 4,906,497 | 3/1990 | Hellmán et al. | 428/49 |
| 4,926,029 | 5/1990 | Pearson | 222/146.5 X |
| 4,934,561 | 6/1990 | Ness et al. | 222/146.5 X |
| 4,988,841 | 1/1991 | Pesheck et al. | 219/10.55 M |
| 5,012,068 | 4/1991 | Anderson | 219/10.55 M |
| 5,049,714 | 9/1991 | Beresniewicz et al. | 219/10.55 F X |

*Primary Examiner*—Andres Kashnikow
*Assistant Examiner*—Kenneth DeRosa
*Attorney, Agent, or Firm*—Calfee, Halter & Griswold

[57] ABSTRACT

An apparatus and a method for dispensing hot melt adhesive or other materials. The apparatus includes a container and an outlet. The container has a first material (the material to be dispensed) disposed therein, which changes from a solid state or a state of high viscosity to a state of low viscosity when heated above a predetermined temperature. The container also has a second material disposed therein, which is adapted to be heated above a predetermined temperature when subjected to microwaves for at least a predetermined period of time. The second material is in a heat transfer relationship with the first material. While the dispenser is being subjected to microwaves, the second material converts the microwave energy into heat and transfers the heat to the first material. The first material then changes to a state of low viscosity and can be dispensed from the container through the outlet.

1 Claim, 5 Drawing Sheets

METHOD OF HEATING AND DISPENSING HOT MELT MATERIALS THAT EMPLOYS MICROWAVE ENERGY

TECHNICAL FIELD

The present invention relates to an apparatus and a method for dispensing hot melt adhesive or other materials. The apparatus comprises a dispenser which is heated by microwaves and then used to dispense a material therefrom. The dispenser is specifically designed to convert microwave energy into heat and to transfer the heat to the material to be dispensed. The dispenser is particularly useful for heating and dispensing a material (e.g. a hot melt adhesive) which is capable of changing from a solid state or a state of high viscosity to a state of low viscosity when heated above a predetermined threshold temperature, thereby enabling the material to be dispensed when in the state of low viscosity.

BACKGROUND

Conventionally, hot melt adhesive was applied using hot melt adhesive applicators (glue guns). These glue guns were designed to be connected to a wall socket by an electrical cord and plug for continuously applying electrical power to the glue gun, thereby melting the adhesive in the glue gun. This meant that the range over which the glue gun could physically operate was determined by the length of the electrical cord coupling the glue gun to the wall socket. Moreover, the cord at times presented a physical obstacle for a user to maneuver around when using the glue gun.

To solve these problems, a cordless glue gun was designed. A cordless glue gun is a glue gun that can detach from its source of electricity so that it can operate without an electrical cord. In designing a cordless glue gun, significant attention needs to be paid to the support structure for the gun. The support structure must conveniently support the glue gun and enable the glue gun to be electrically energized (heated) while it is on the support structure. Moreover, the support structure and the glue gun need to be designed to enable convenient release of the glue gun from the support structure and from the source of electricity when it is desired to use the glue gun. Toward these purposes, the support structure includes a socket for transmitting electrical energy to the glue gun and a release mechanism enabling the glue gun to be disconnected from the socket when it is released from the support structure.

Despite the improvements that a cordless glue gun offers over a conventional glue gun, a cordless glue gun still has its drawbacks. Although the cordless glue gun does not require continuous electrical power, it must be initially electrically heated while on the support structure and may require intermittent electrical heating to maintain the hot melt adhesive in a state of low viscosity. Additionally, both the conventional glue gun and the cordless glue gun require hot melt adhesive sticks or other forms of bulk adhesive to be inserted into the glue gun. This requires the purchase of the hot melt adhesive separate from the purchase of the glue gun itself and the handling of the hot melt adhesive before each use of the glue gun. Moreover, both the conventional glue gun and the cordless glue gun are bulky, relatively expensive to purchase, need a relatively long preheating time before glue can be dispensed, and a relatively long cool down period before being stored away.

SUMMARY OF THE INVENTION

The present invention provides a totally new approach to the concept of hot melt adhesive dispensers. The present invention provides a dispenser which is disposable, small, relatively inexpensive, and capable of being heated in a microwave oven. In addition, the dispenser concept of the invention is also believed to be useful for dispensing a variety of other materials, such as food products (i.e. hard candy, chocolate), solder, wax, and oil.

Generally, the present invention provides a new and useful apparatus and method for dispensing materials capable of changing from a solid state or a state of high viscosity to a state of low viscosity when heated above a predetermined threshold temperature.

In accordance with the preferred embodiment of the present invention, the dispenser includes a first material to be dispensed, a second material in a heat transfer relationship with the first material, a container within which the first material and the second material are disposed, and an outlet through which the first material can be dispensed.

The first material is capable of changing from a solid state or a state of high viscosity to a state of low viscosity when heated above a predetermined temperature. According to the preferred embodiment, this material is a hot melt adhesive. This first material is in a heat transfer relationship with a second material. The second material is adapted to be heated above a predetermined temperature when subjected to microwaves for at least a predetermined period of time. According to the preferred embodiment, this material is a susceptor.

Both the first material and the second material are disposed within a container. According to the preferred embodiment, the second material surrounds the first material. The first material is dispensed from the container through an outlet. According to the preferred embodiment, the outlet is a nozzle through which the first material can be dispensed (preferably extruded). Additionally, the second material is disposed within the nozzle to maintain heat in the nozzle for a period of time after the dispenser has been subjected to microwaves. This allows the first material in the nozzle to remain in a state of low viscosity for a longer period of time after the dispenser is removed from the microwave oven.

Another aspect of the invention comprises a special cover for the dispenser. The cover is designed to support the dispenser in an upright orientation in a microwave oven. Moreover, the cover is made of a heat insulating material which does not heat in a microwave oven. The cover forms an insulating jacket which allows the cover and dispenser to be removed as a unit from a microwave oven by gripping the insulating jacket. Also, the cover has a flexibility that allows it to be squeezed against the dispenser in order to force the hot melt adhesive through the nozzle of the dispenser.

Other features and advantages of the present invention will become apparent from the following detailed description and accompanying drawings which form a part of the specification.

DETAILED DESCRIPTION OF THE PREFERRED EMBODIMENT

Figure 2:
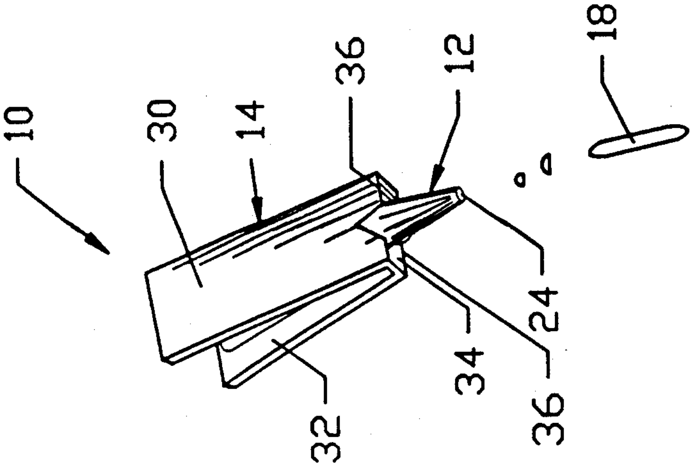
FIG. 2 is a schematic illustration of the dispenser and cover of FIG. 1, showing the manner in which they are used.
Figure 1:
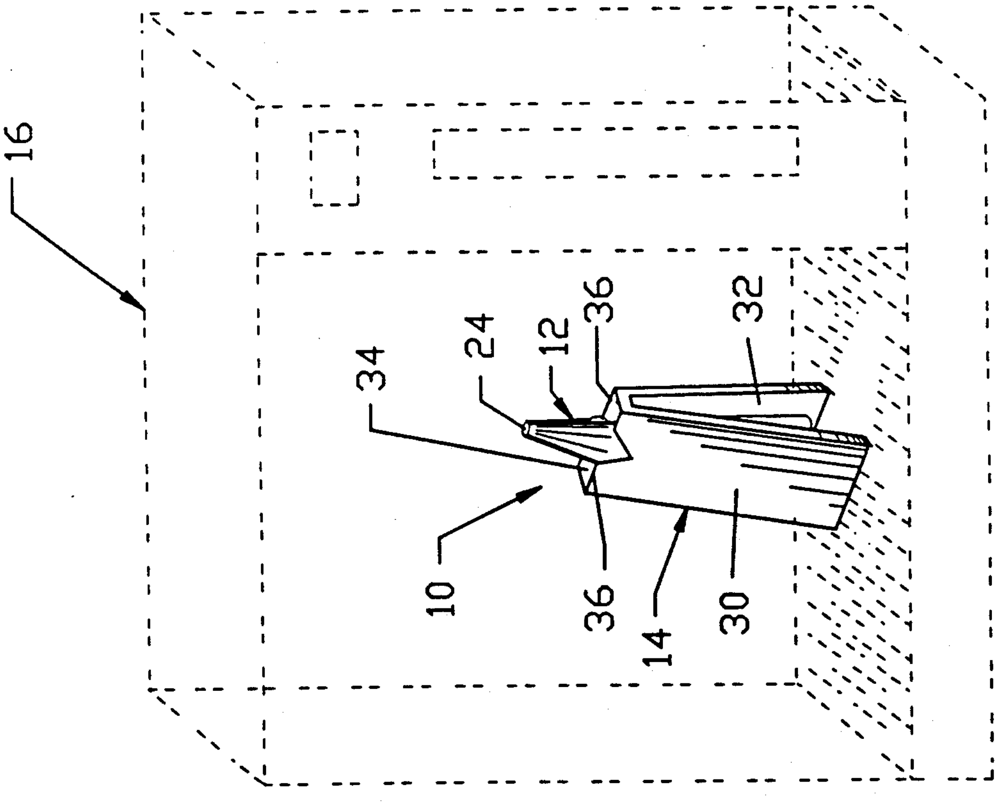
FIG. 1 is a schematic illustration of a dispenser and a cover therefor, constructed according to the principles of this invention, standing upright in a microwave oven as they would be while being heated.
Figure 3:
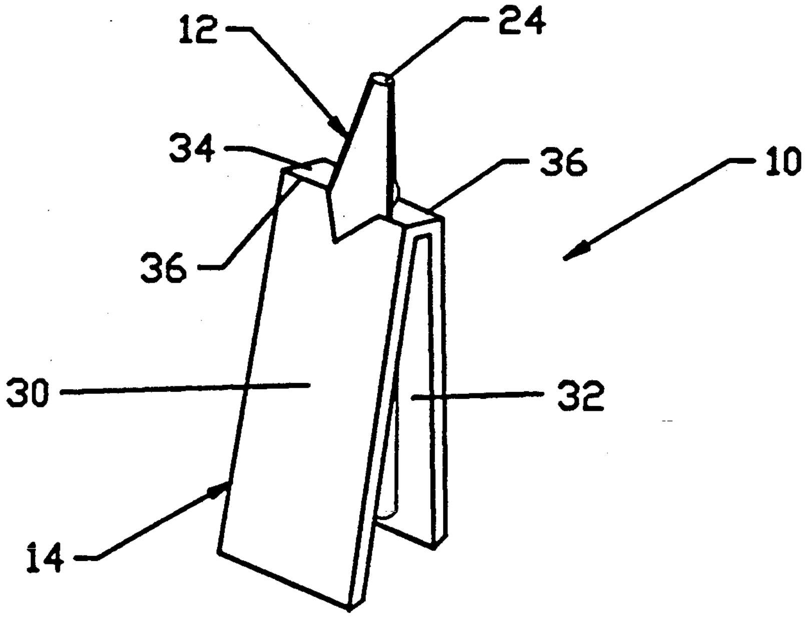
FIG. 3 is an enlarged illustration of the dispenser and cover of FIG. 1.
Figure 4:
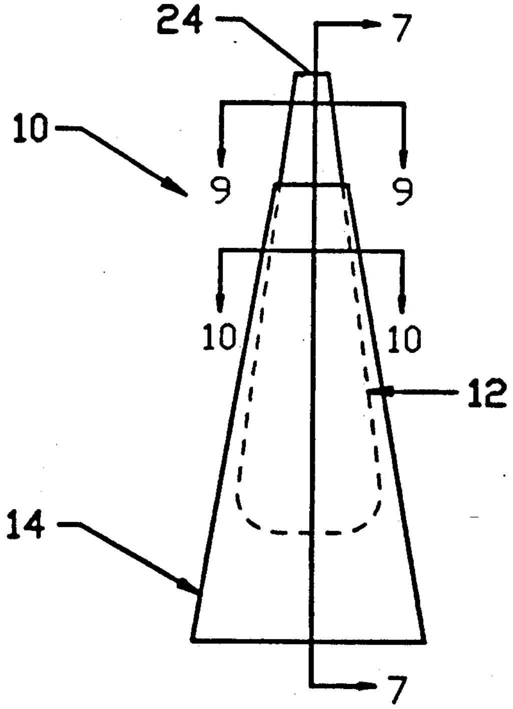
FIG. 4 is a front view of the dispenser and cover of FIG. 1.
Figure 5:
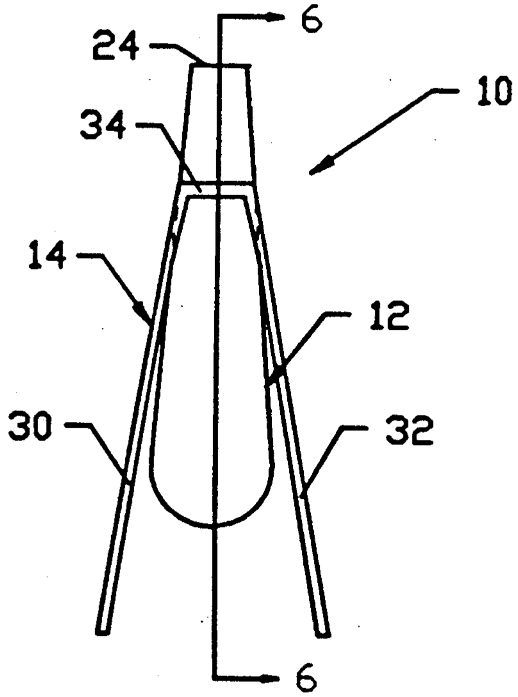
FIG. 5 is a side view of the dispenser and cover of FIG. 3.

Referring to the figures, a dispensing unit 10 includes a dispenser 12 and a cover 14 therefor. The dispenser 12 and the cover 14 are heated in a microwave oven 16, as illustrated in FIG. 1. The cover 14 holds the dispenser 12 in an upright position while being heated in the microwave oven 16. After being heated in the microwave oven 16, the dispenser 12 and the cover 14 are removed from the microwave oven 16 as a unit, and can be used to apply the hot melt adhesive, as illustrated in FIG. 2.

The dispenser 12 includes a first material 18 to be dispensed, a second material 20 in a heat transfer relationship with the first material 18, a container 22 within which the first material 18 and the second material 20 are disposed, and an outlet 24 through which the first material 18 can be dispensed.

The first material 18, the material to be dispensed, is capable of changing from a solid state or a state of high viscosity to a state of low viscosity when heated above a predetermined temperature. Preferably, this material is a hot melt adhesive. A hot melt adhesive suitable for these purposes is manufactured and sold by the H.B. Fuller Company under the mark/designation Product Number 2125. It is also believed that various other hot melt adhesives and other non-adhesive materials may be used with the dispenser. Some examples of other non-adhesive materials are food products (i.e. hard candy, chocolate), solder, wax, and oil.

The second material 20, which is in a heat transfer relationship with the first material 18, is adapted to be heated above a predetermined temperature when subjected to microwaves for at least a predetermined period of time. This material is a susceptor. Susceptors are known elements for use in microwave cooking. A susceptor basically comprises metal particles adhered to a film. Susceptors are normally classified by their optical density. Susceptors for use in a dispenser according to the invention can have an optical density in the range of 0.15 to 0.35, which is a standard commercial range. Preferably, a susceptor for use in the present invention has an optical density of 0.25. A commercially available susceptor which can be used to form a dispenser according to the present invention comprises metal particles disposed on a high temperature polyamide film, and is manufactured and sold by National Metalizing Company, Abeel Road, Cranbury, N.J. The polyamide film is manufactured and sold by E. I. du Pont de Nemours & Co. under the mark/designation Capton. Another high temperature polyamide film which may also be used is a polyamide manufactured and sold by General Electric Company, Schenectady, New York under the mark/designation Ultem. The high temperature polyamide film forms a flexible heat retaining outer layer for the container 22.

The outlet 24, through which the first material 18 is dispensed, preferably forms a nozzle. However, with other forms of dispensers, other forms of outlets may be suitable. For example, if the dispenser had the form of a pitcher, the outlet could have the form of a spout. Preferably, the susceptor coats the entire inside of the dispenser 12, including the nozzle 24. Coating the nozzle 24 with the susceptor helps maintain heat in the nozzle 24 for a period of time after the dispenser 12 has been heated in a microwave oven 16. This allows the first material 18 in the nozzle 24 to remain in a state of low viscosity for a longer period of time after being removed from the microwave oven 16.

The cover 14 comprises a pair of side members 30, 32 and a central member 34 therebetween. The side members 30, 32 and the central member 34 are integrally formed, and have an integrally formed hinge structure 36 between each side member 30, 32 and the central member 34. Preferably, the cover 14 comprises an opening 38 extending through the central member 34, each hinge structure 36, and through the top portion of each of the side members 30, 32. The opening 38 is dimensioned to allow the nozzle 24 of the dispenser 12 to fit therethrough.

The cover 14 is preferably formed of relatively rigid, heat insulating composite material. The composite is formed by laminating 1/16 to 3/32 of an inch of a foam polystyrene to a bleached hardwood kraft paper with a thickness of 0.010 to 0.020 of an inch. Foam polystyrene and bleached hardwood kraft paper suitable for these purposes are each well known products and are commercially available from numerous sources.

Figures 6, 7, 8:
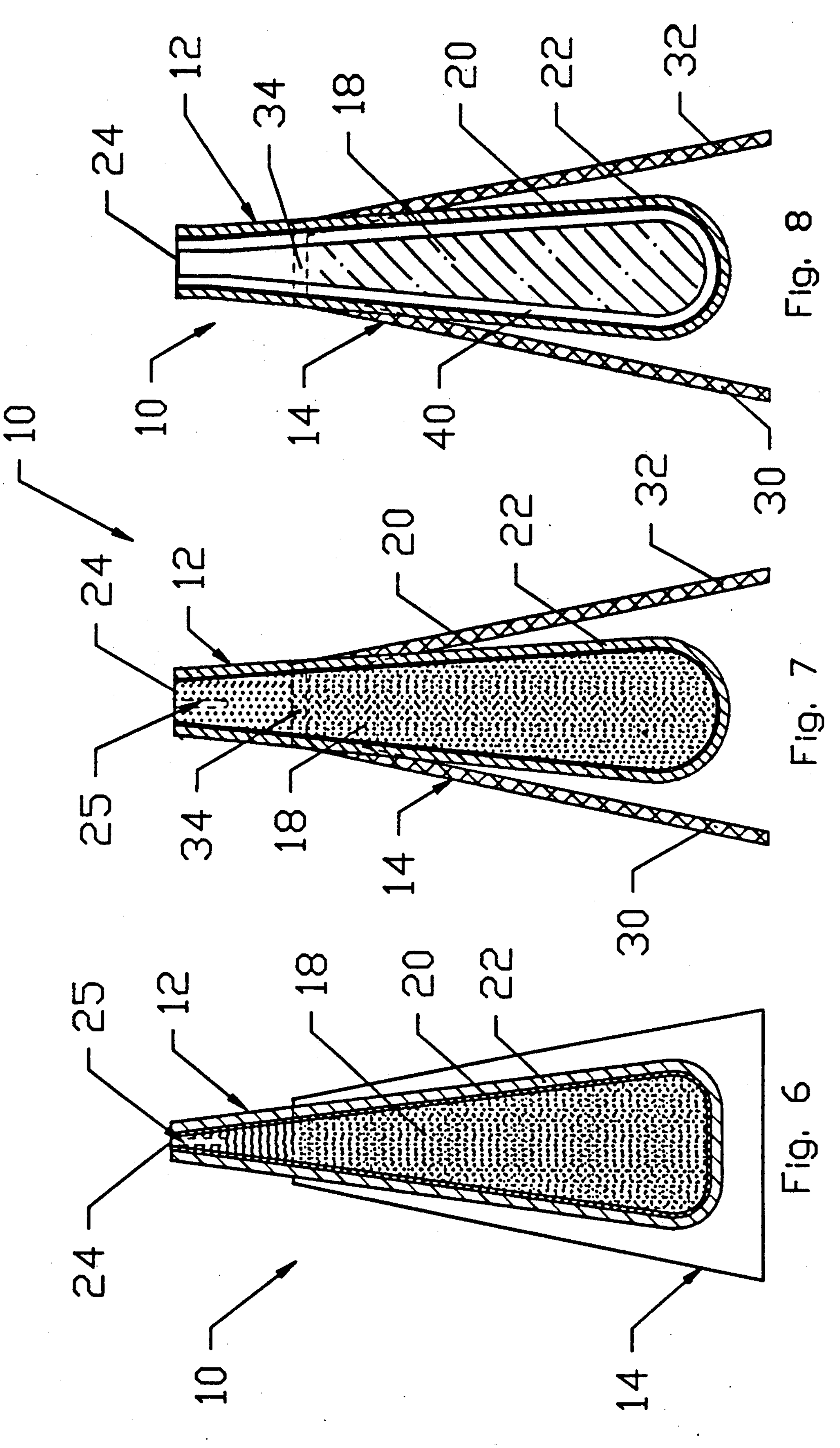
FIG. 6 is a cross-sectional view of the dispenser and cover of FIG. 5, taken along line 6—6.
FIG. 7 is a cross-sectional view of the dispenser and cover of FIG. 4, taken along line 7—7.
FIG. 8 is a cross-sectional view of a dispenser and cover therefor, similar to that in FIG. 7, with the addition of a third material in the dispenser.
Figure 10:
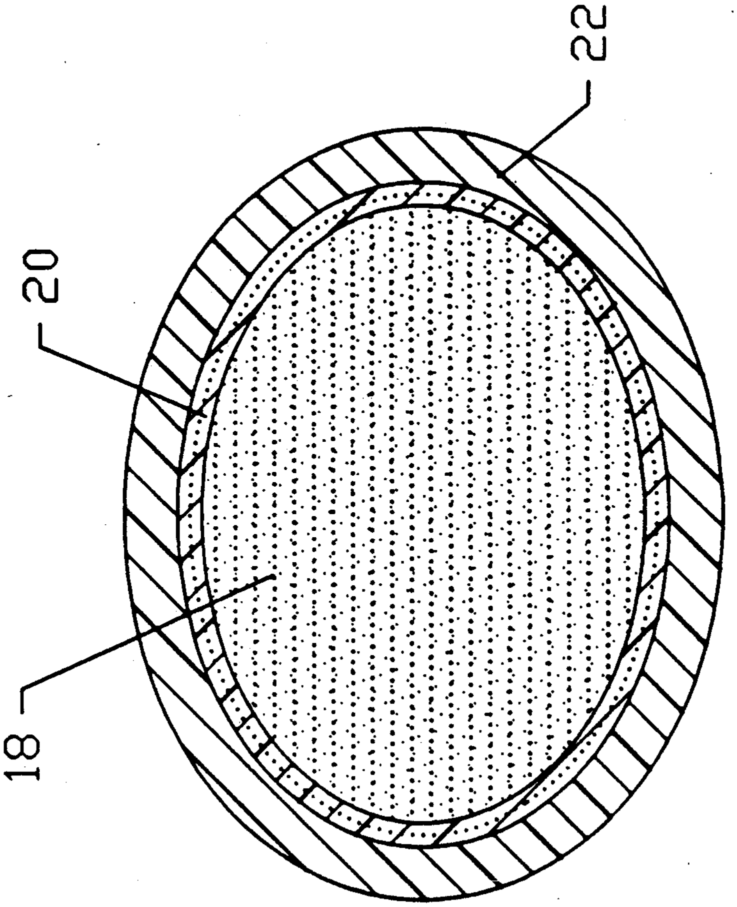
FIG. 10 is a cross-sectional view of the dispenser of FIG. 4, taken along line 10—10.
Figure 9:
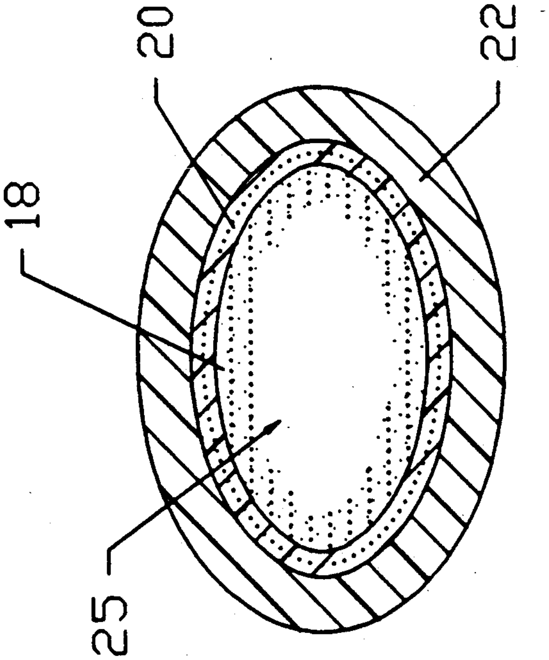
FIG. 9 is a cross-sectional view of the dispenser of FIG. 4, taken along line 9—9.
Figure 11:
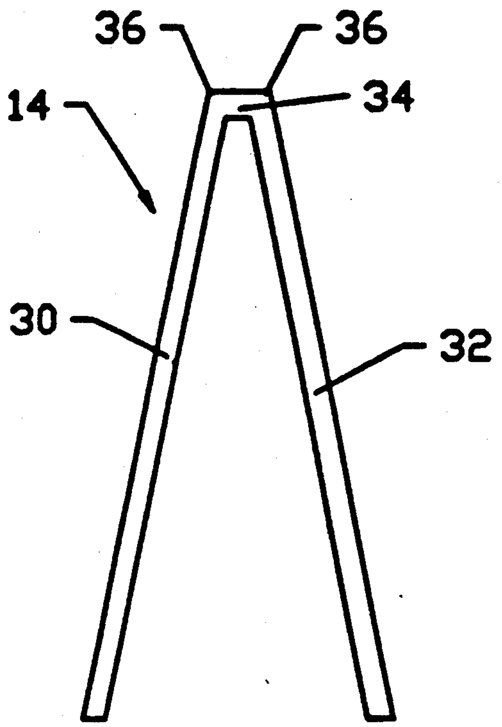
FIG. 11 is a side view of the cover of FIG. 3.
Figure 12:
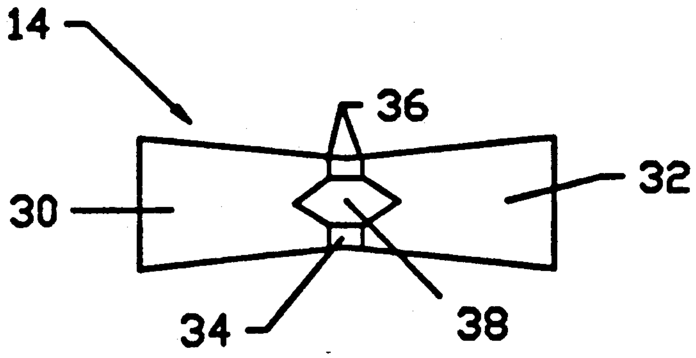
FIG. 12 is a top view of the cover of FIG. 11.

The heat insulating property of the cover 14 prevents burning of a user's hand while the user is handling the dispenser after it has been heated. The rigidity and the design of the side members 30, 32 and the central member 34 forming the cover enables the 14 cover to assume and maintain a generally inverted "V" shaped configuration to support the dispenser 12 in an upright position (nozzle pointed upward) while it is being heated in the microwave oven 16 (see FIG. 1). With hot melt adhesive, it is believed important to leave the nozzle 24 uncovered, so that the hot melt adhesive can be readily applied to an object after the adhesive is heated. Maintaining the dispenser 12 in an upright orientation prevents hot melt adhesive from dripping from the dispenser during the heating process. As illustrated in FIGS. 6 and 7, it is desirable to leave a small central air space 25 in the hot melt adhesive 18 disposed in the nozzle 24, to allow for expansion of the adhesive during heating while minimizing the risk of adhesive inadvertently dripping from the open nozzle during the heating process. The design of the cover also enables the user to use the cover to grasp the dispenser, and the hinge structures 36 provide the cover 14 with a flexibility which enables a user to squeeze the side members 30, 32 against the dispenser 12 to dispense the first material therefrom.

A dispenser according to the invention is preferably designed to heat hot melt adhesive. The hot melt adhesive will have a threshold temperature to which it must be heated in order to change from a state of high viscosity to a state of low viscosity in which it can be extruded from the dispenser. The susceptor is adapted to heat rapidly in a microwave oven to a high enough temperature and to transfer sufficient heat to the hot melt adhesive to change the hot melt adhesive to its low viscosity state. Of course, the particular time that may be required to heat the dispenser in a microwave will depend on factors such as (i) the amount of hot melt adhesive in the dispenser and (ii) the optical density of the susceptor. With a relatively small amount of adhesive (i.e. an amount suitable for one small home repair application) and a susceptor with the preferred optical density of 0.25 lining the inside of the dispenser, it is believed the dispenser, when disposed in most conventional home microwave ovens, will change the hot melt adhesive to its low viscosity state in less than one minute.

As previously discussed, it is believed that the concepts of the present invention are applicable to forming disposable dispensers for a variety of materials. In connection with dispensers for some of these materials, it may be desirable to modify the preferred embodiment of the present invention. One possible modification is the addition of a third material 40 disposed within the container 22, between the susceptor 20 and the first material 18 (see FIG. 8). The third material 40 would not impede efficient heat transfer between the susceptor 20 and the first material 18, but would provide a physical layer therebetween. The layer could be useful to promote good flow of the first material 18 from the container 22, and/or to provide a barrier between the susceptor 20 and the first material 18 for health reasons (e.g., when the first material is a food product).

While the preferred embodiment and several possible modifications of the present invention have been described in detail, it should be apparent that the concepts of the present invention can be incorporated into dispensers of other constructions and for other materials, that such additional modifications will be apparent to those of ordinary skill in the art, and that the present invention is intended to cover all devices incorporating the concepts of the present invention as defined within the appended claims.

We claim:

1. A method of applying a mass of hot melt adhesive to an object, comprising the steps of:

(i) providing a container with said mass of hot melt adhesive and a susceptor enclosed therein, said mass of hot melt adhesive being in a substantially solid state, and said susceptor being in a heat transfer relationship with said mass of hot melt adhesive, (ii) subjecting said container with said mass of hot melt adhesive and said susceptor disposed therein to a source of microwaves for a period of time sufficient to heat said susceptor to at least a predetermined temperature and to transfer sufficient heat from said susceptor to said mass of hot melt adhesive to change said mass of hot melt adhesive from said substantially solid state to a flowable, tacky state, and (iii) causing said flowable, tacky mass of hot melt adhesive to flow from said container onto said object.

* * * * *